Figure 1:
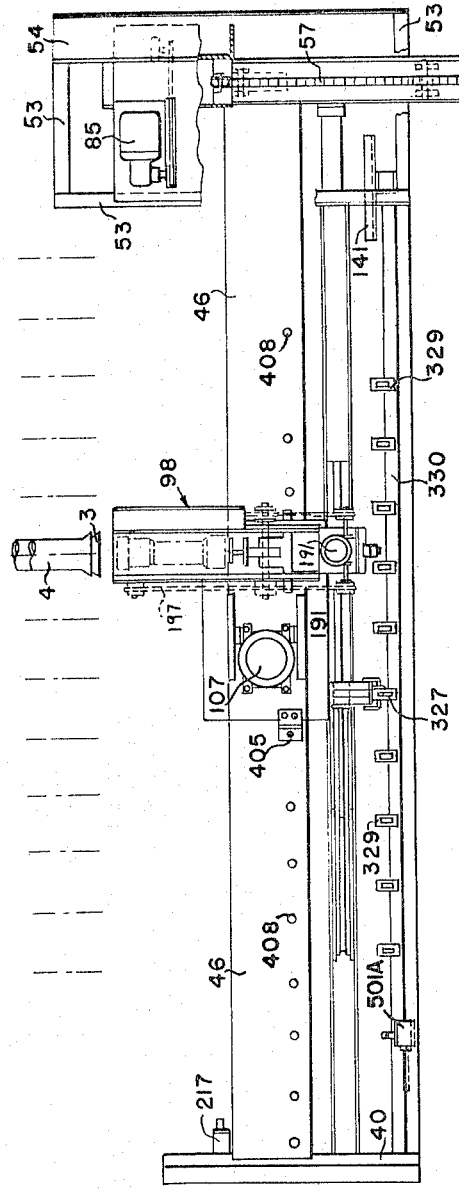

Jan. 3, 1967

P. F. CROSBY ETAL 3,295,662

CENTRAL EXCHANGE DISPATCHER FOR PNEUMATIC TUBE SYSTEMS

Filed Aug. 24, 1964

10 Sheets-Sheet 1

*INVENTORS.*
PETER F. CROSBY
BY CHARLES W. WALLIS
WILLIAM D. BUDYNAS

*D. Emmett Thompson*
ATTORNEY.

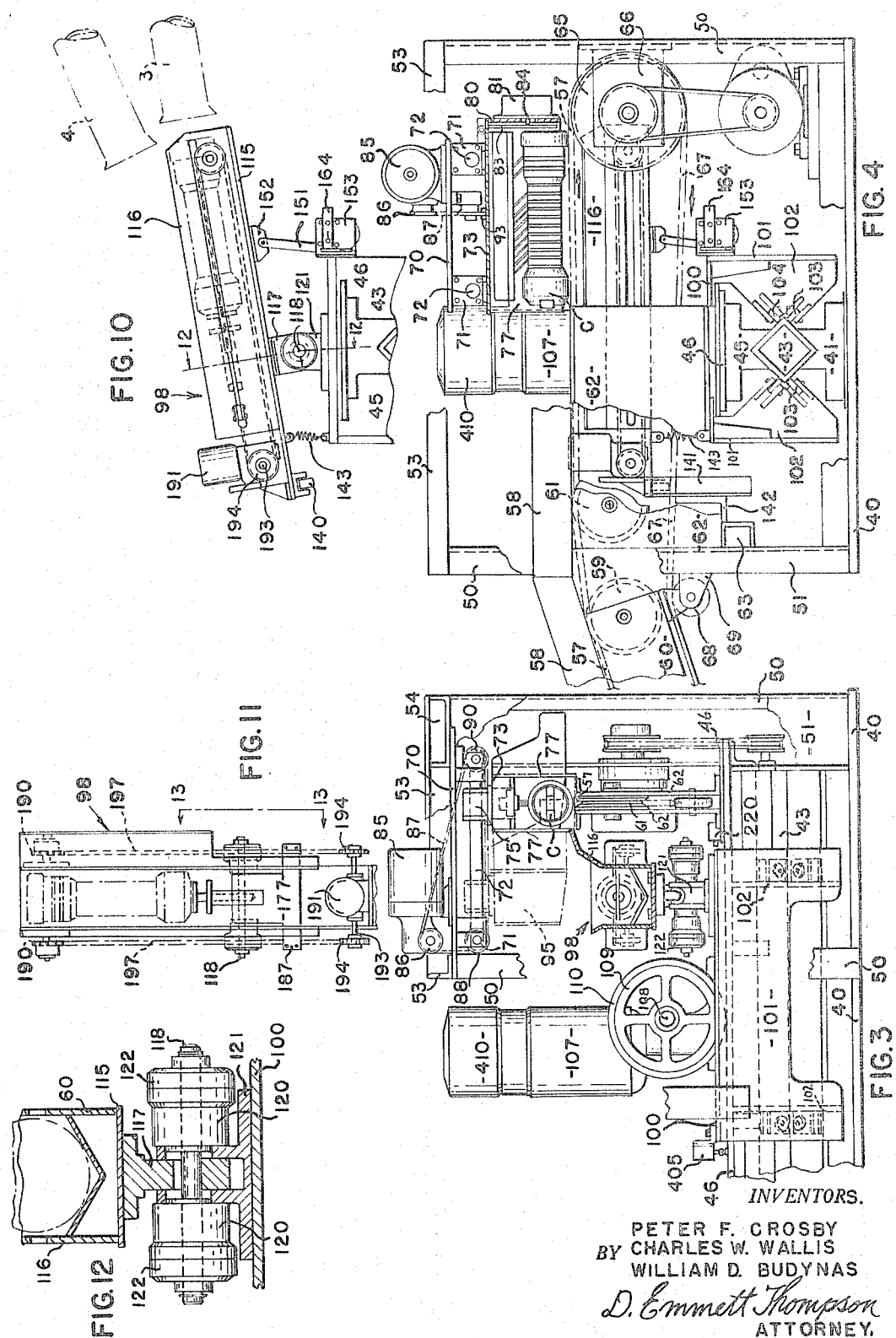

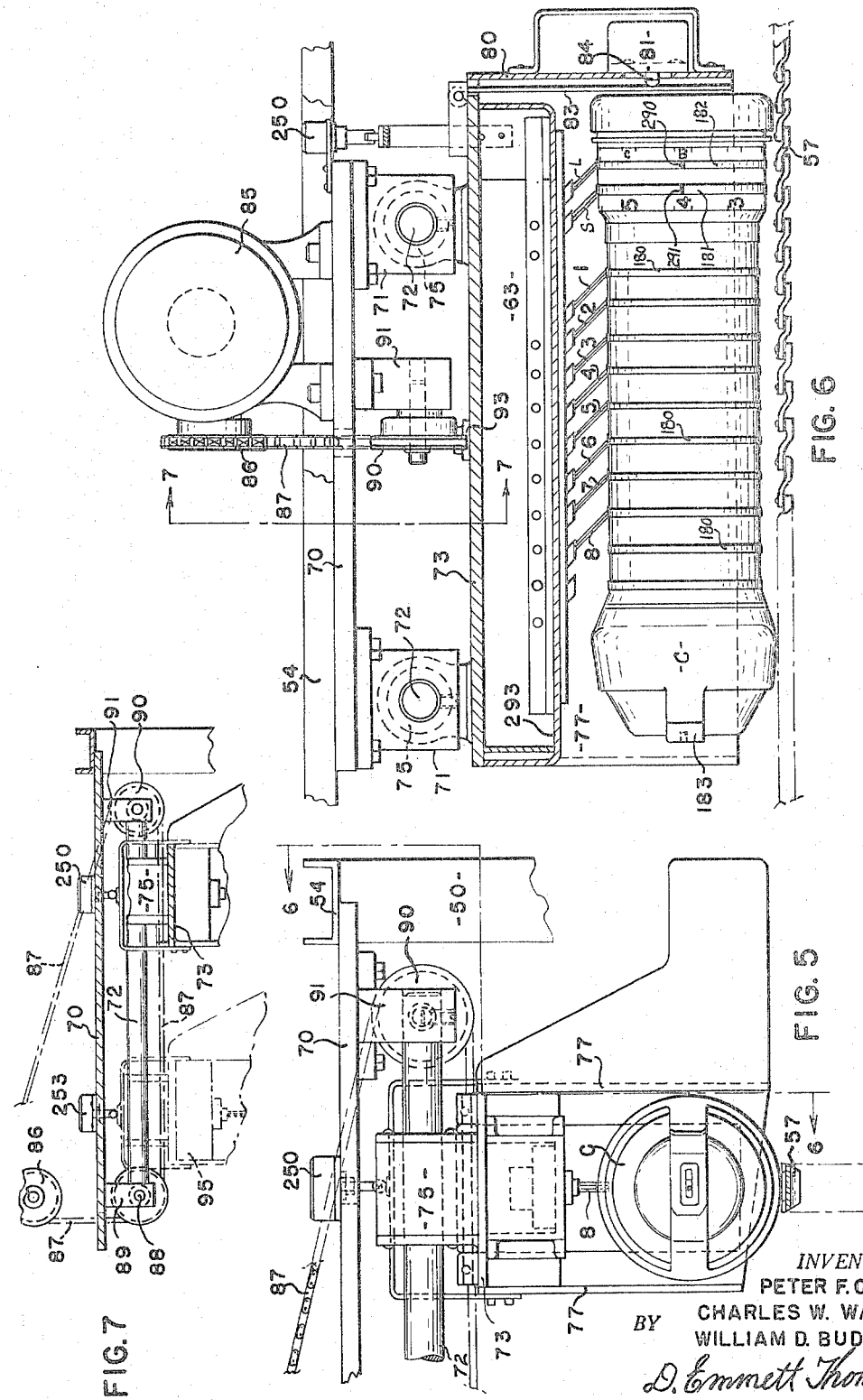

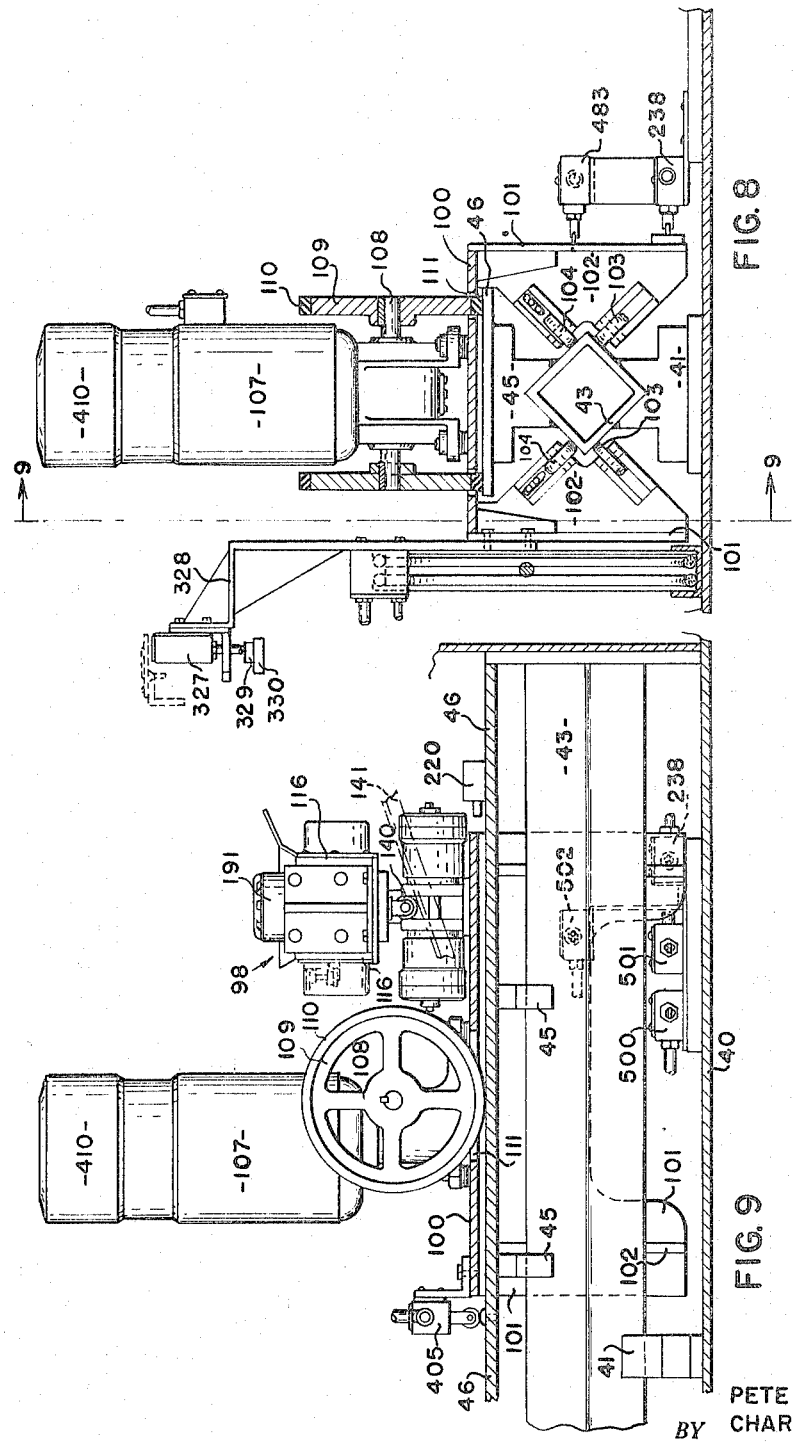

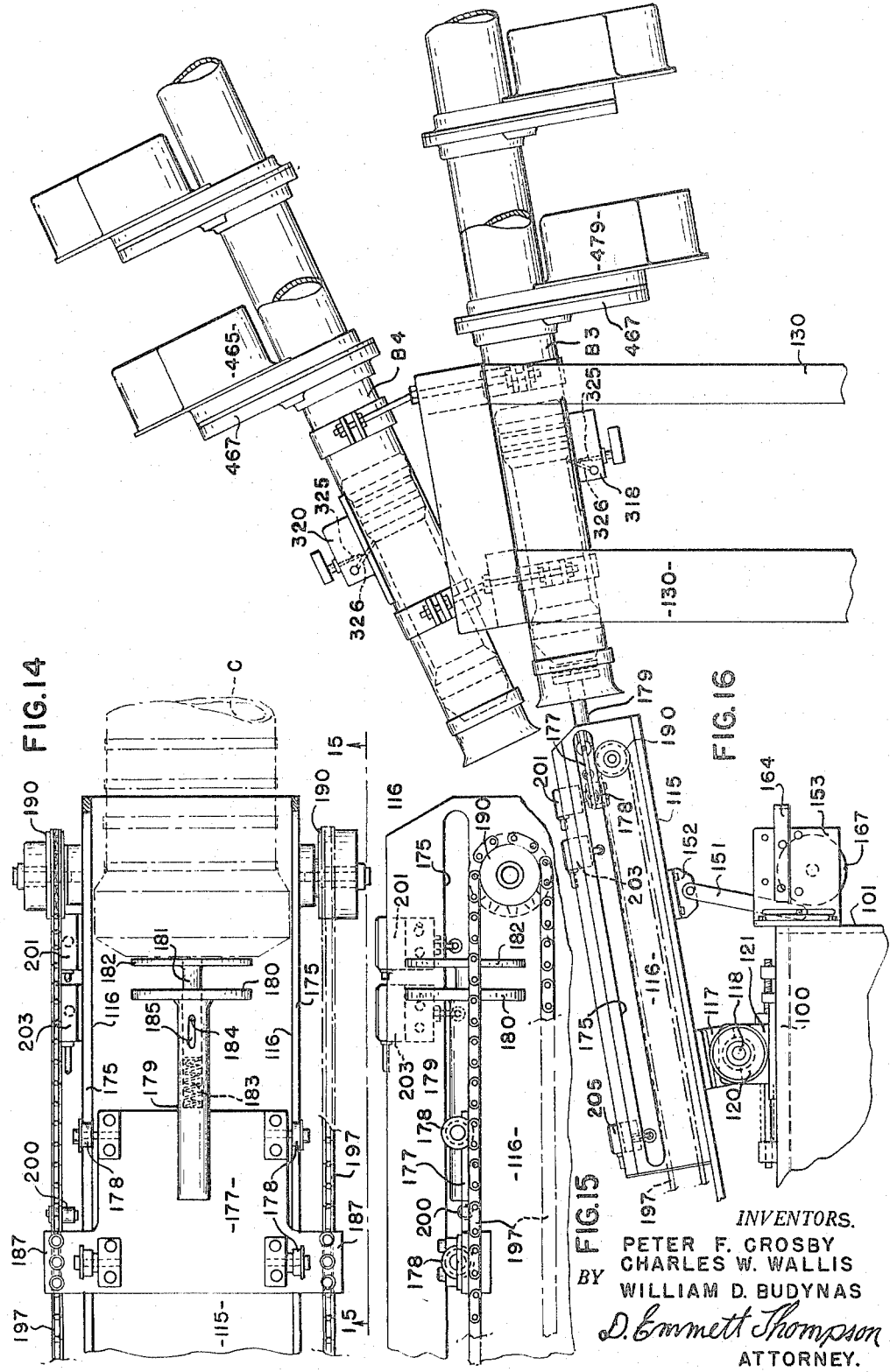

Jan. 3, 1967   P. F. CROSBY ETAL   3,295,662
CENTRAL EXCHANGE DISPATCHER FOR PNEUMATIC TUBE SYSTEMS
Filed Aug. 24, 1964   10 Sheets-Sheet 10

INVENTOR.
PETER F. CROSBY.
CHARLES W. WALLIS.
BY WILLIAM D. BUDYNAS.

D. Emmett Thompson
ATTORNEY.

United States Patent Office 3,295,662
Patented Jan. 3, 1967

3,295,662
CENTRAL EXCHANGE DISPATCHER FOR PNEUMATIC TUBE SYSTEMS
Peter F. Crosby, Cazenovia, Charles W. Wallis, East Syracuse, and William D. Budynas, Liverpool, N.Y., assignors to Lamson Corporation, Syracuse, N.Y., a corporation of New York
Filed Aug. 24, 1964, Ser. No. 391,698
11 Claims. (Cl. 198—38)

This invention has to do with a central exchange dispatcher for pneumatic tube systems. In modern pneumatic tube installations of any substantial size, there is apparatus located at the central station which functions automatically to sense the code destination on each incoming carrier and then transfer the carrier to the proper outgoing tube. In such systems there are a number of receiving stations located on each outgoing tube whereby each tube is capable of handling a high volume of traffic.

In older installations the incoming carriers are dropped into a bin or receptacle located at a central point in the system, and the carriers are then manually picked up, the code destination determined and the carrier is then manually inserted in the receiving end of the proper outgoing tube. In such systems each outgoing tube extends only to one receiving station.

It is not practical or feasible to install the automatic apparatus referred to above in the central station of an older system to convert the same from manual to automatic operation. There are a number of reasons why this substitution is impractical; the main reason is the extensive cost which results from the fact that the entire tube system has to be revamped to accommodate the automatic central station dispatching apparatus. This revamping consumes a considerable amount of time and necessitates extensive and expensive work on the building by way of tearing out the partitions, ceilings, etc. in which the tubes of the old system are installed. Usually the cost involved is prohibitive.

This invention has as an object a central exchange carrier dispatching apparatus involving a novel structural arrangement, permitting the apparatus to be installed in the room in which the central exchange is located in installations previously installed.

The invention has as a further object a central exchange dispatcher for pneumatic tube systems by which the code destination on the incoming carriers is automatically sensed and the carrier moved in registration with the proper outgoing tube, the apparatus functioning to sense and properly dispatch a substantially greater number of tubes per minute than by the old hand method.

The invention has as a further object, a central station dispatcher for pneumatic tube systems embodying an arrangement functioning in such manner that if the outgoing tube for which a carrier is destined is already occupied, that carrier will be transferred for re-circulation for the incoming tubes.

The invention consists in the novel features and in the combinations and constructions hereinafter set forth and claimed.

In describing this invention, reference is made to the accompanying drawings in which like characters designate corresponding parts in all the views.

Figure 2:
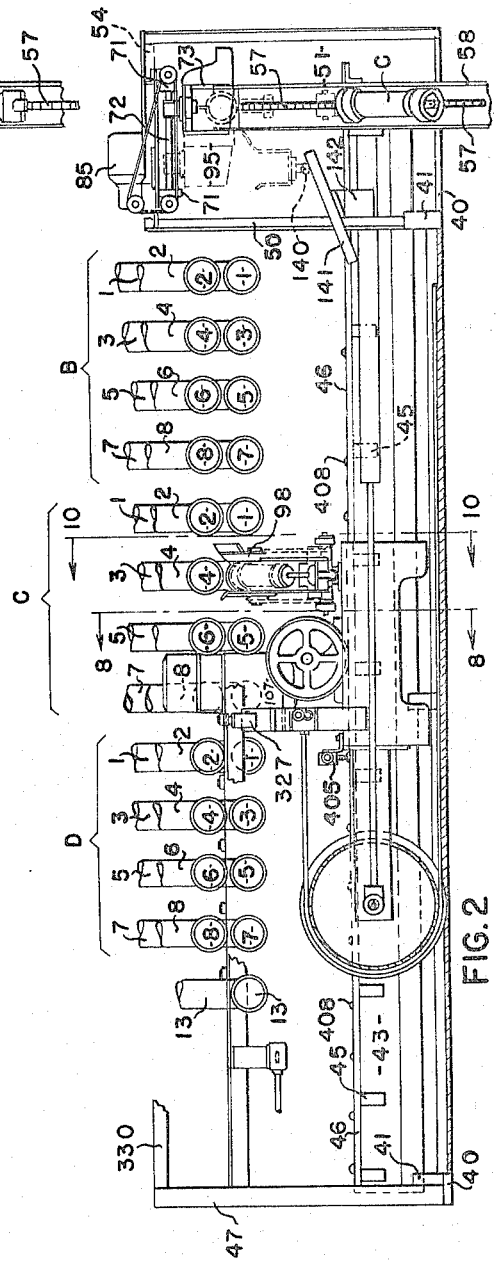

In the drawings—
FIGURE 1 is a top plan view of a central exchange dispatcher embodying our invention.
FIGURE 2 is a front elevational view with parts in section.
FIGURE 3 is an enlarged view of the carrier loading mechanism shown at the right end portion in FIGURES 1 and 2.

Figure 13A:
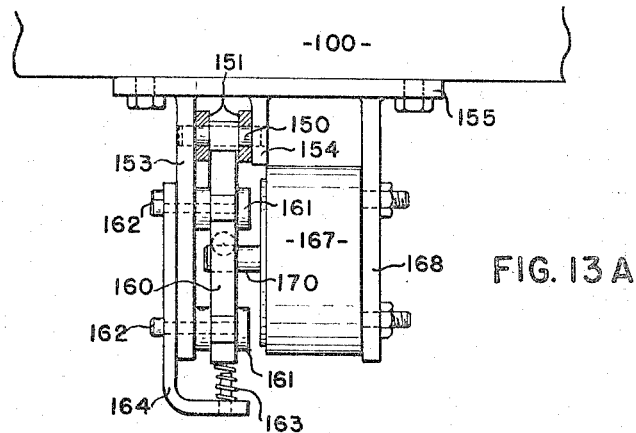
Figure 13:
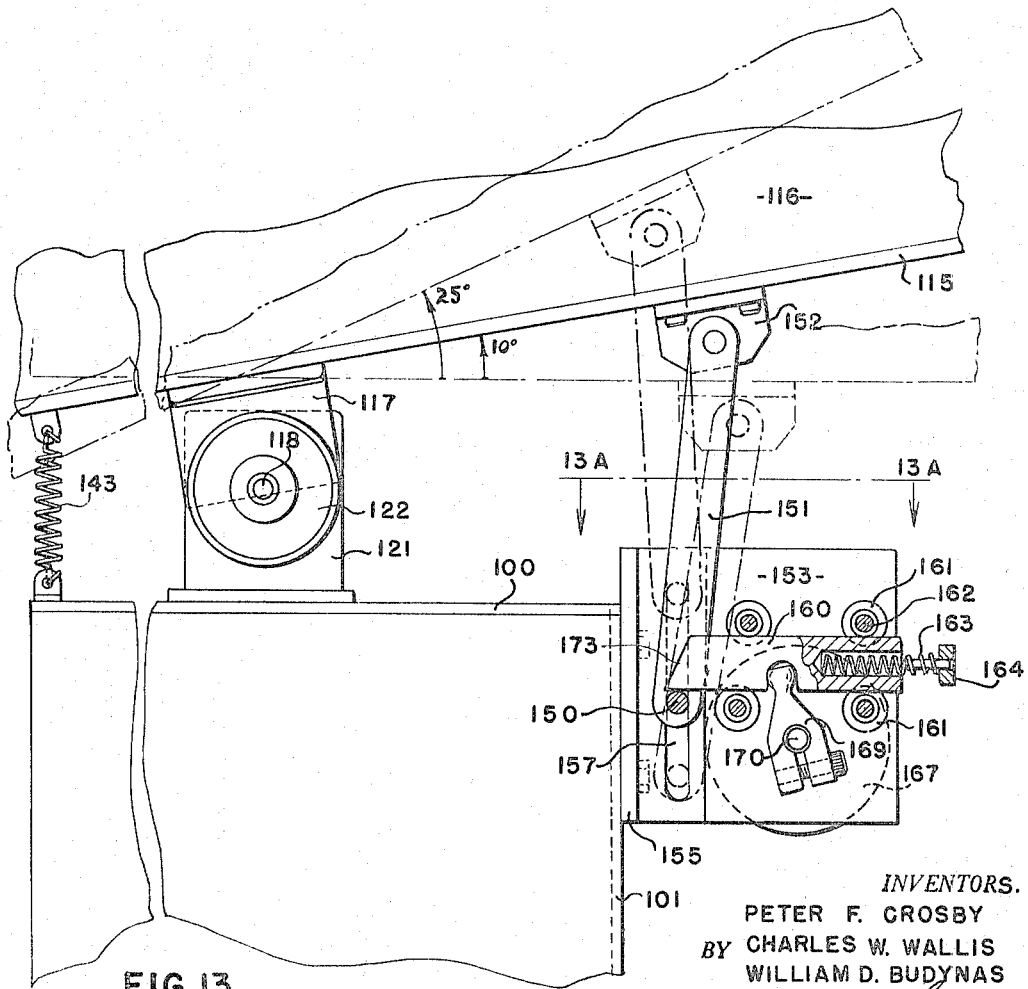

FIGURE 4 is a view, looking to the left, FIGURE 3, with parts removed and parts in section.
FIGURE 5 is an enlarged view of the carrier loading mechanism shown in the upper right portion of FIGURE 3.
FIGURE 6 is a view taken on line 6—6, FIGURE 5.
FIGURE 7 is a view taken as indicated by line 7—7, FIGURE 6.
FIGURE 8 is a view taken on line 8—8, FIGURE 2, but with the carriage located at the loading station.
FIGURE 9 is a view taken on a line corresponding to line 9—9, FIGURE 8.
FIGURE 10 is a view taken on line 10—10, FIGURE 2.
FIGURE 11 is a top plan view of the structure shown in FIGURE 10.
FIGURE 12 is a view taken on line 12—12, FIGURE 10.
FIGURE 13 is an enlarged side view of the pivotal mounting for the carrier ejection mechanism indicated by the line 13—13, FIGURE 11.
FIGURE 13A is a view taken on line 13A—13A, FIGURE 13.
FIGURE 14 is an enlarged top plan view of the right portion of FIGURE 10, with the carrier ejector partially advanced.
FIGURE 15 is a view indicated by the line 15—15, FIGURE 14.
FIGURE 16 is a side elevational view of the carrier ejection mechanism and the receiving ends of a pair of discharge tubes.
FIGURES 17–20 are schematic wiring diagrams of the control circuitry for the dispatcher.

The incoming coded carriers are successively moved to a loading station at the right end of the dispatcher, FIGURES 1 and 2. The carriers are then deposited in an ejection mechanism mounted on a carriage which moves along an elongated trackway which comprise the main portion of the frame structure. The carriage is moved to a preselected ejection station, according to the destination code on the carrier in the ejection mechanism. Upon arrival at the selected station, the carrier is ejected into the proper outgoing tube.

The apparatus is mounted on a series of cross members 40 to which are fixedly secured pedestals 41, formed with V-shaped notches in their upper ends, to receive an elongated tubular member 43, square in cross section. One corner of the member 43 is positioned in the V notches in the pedestals 41 and fixed thereto as by welding. Similar pedestals 45 are fixed along the upper corner ridge of the tubular member 43, and a plate 46 is affixed to the members 45. Uprights 47, FIGURE 2, are mounted on the base cross member 40 at the left end of the machine, and there are four upstanding members 50 at the right end of the frame structure. One of these members, as 51, is channel-shaped in cross section. The upper ends of the members 50, 51 are connected by cross members 53, one of which, as 54, is of channel formation with the open side of the channel facing upwardly.

Referring to FIGURES 1, 2, 3 and 4, the coded conveyors are advanced to the machine by an endless conveyor belt 57 having its upper run movable in a trough member 58. The upper run 57 of the conveyor belt is trained over an idler sheave 59 journalled between side members 60. The belt passes over a second idler sheave 61 which is journalled between a pair of channel members 62 fixedly secured to the top plate 46 of the trackway. The front ends of the channel members 62 are supported by a cross member 63, see FIGURE 4. The upper run 57 of the conveyor belt moves in a plane slightly above the upper edges of the channel members 62, and extends about a sheave 65 journalled in a bracket 66 fixedly secured to the rearward ends of the channel members 62. The upper run 57 of the conveyor belt moves to the right, FIGURE 4. The return run 67 of the belt is trained over pulley 68 which is journalled in bracket 69 fixedly secured to upright 51.

Referring to FIGURES 4, 5, and 6, a plate 70 is fixedly secured to the upper cross members 53, 54. Four support members 71, depend from the plate 70, each pair serving to support a rod 72. A loader 73 is formed with spaced apart bosses 75 slidably mounted on the rods 72. The rods 72 extend transversely of the conveyor belt 57. The loader 73 is provided with depending side plates 77, the spacing between these plates being such as to receive a carrier C, the plates terminating at their lower edges in proximity to the upper edges of the channel members 62, see FIGURE 3. Normally, the member 73 is positioned above the channel member 62 for the reception of a carrier C advanced by the conveyor belt 57 (see FIGURE 4). The side members 77 carry an end wall plate 80 at their rear ends to which is mounted a switch 81. A plate 83 is pivotally mounted at its upper end on the loader 73, and is moved into engagement with the actuator 84 of switch 81, when a carrier C is moved in between the side members 77, as illustrated in FIGURES 4 and 6.

Actuating the switch 81 furnishes power to a motor 85 mounted on the plate 70. The output shaft of the motor 85 is provided with a sprocket 86, see FIGURE 6, over which the chain 87 is trained. The chain 87 extends downwardly from the sprocket 86 and is trained about an idler sprocket 88 journalled in a bracket 89 depending from the plate 70 and about a second idler sprocket 90 journalled in a bracket 91. The chain 87, intermediate the sprockets 88, 90, is fixed to the loader 73, as by clamp 93, see FIGURE 6. Actuation of the switch 81 in conjunction with other circuitry provides power to the motor 85 to effect movement of the loader 73 from a position over the channel members 62, as shown in FIGURE 3, to the left indicated by dotted outline at 95, FIGURES 3 and 7, to move the carrier from the top edges of the channel members 62. This movement results in the carrier C being deposited by gravity into a trough-shaped member 98 of the carrier ejection mechanism mounted on a carriage movable along the trackway 46.

The carriage consists of a top plate 100, see FIGURE 8, having depending side members 101. Each side member 101 has affixed to its inner surface a pair of plates 102 extending inwardly toward the tubular member 43. Each of the plates 102 has mounted thereon a pair of rollers 103, 104. The axes of the rollers 103 extend at an angle of 90° to the axes of rollers 104. The arrangement is such that the rollers of each pair engage the flat adjacent side surfaces of the square tubular member 43. The rollers 104 are mounted in brackets adjustable toward and from the tubular member 43, so that the carriage has proper rolling contact therewith. This arrangement permits the carriage to move lengthwise along the trackway, with the top plate 100 of the carriage having a slight clearance above the trackway top plate 46, see FIGURES 8 and 9.

The carriage is moved along the trackway by an electric motor 107 having an output shaft 108 extending transversely of the trackway. There is a rubber tired wheel 109 mounted on each end of the shaft 108 and being fixedly secured thereto. The rubber tires 110 on the wheels 109 engage the top plate 46 of the trackway, the top plate 100 of the carriage being provided with slots 111 to permit this frictional engagement between the wheels 109 and the trackway top plate 46.

The ejector mechanism includes the trough-shaped member 98, previously referred to, which is formed with a bottom wall 115 and side walls 116. The bottom wall has affixed thereto a boss 117 apertured to receive a shaft 118 to which it is fixedly secured. The shaft 118 extends laterally from the boss 117, see FIGURE 12, and is journalled in members 120, which are fixedly secured to a bifurcated bracket 121 which, in turn, is fixedly secured to the top plate 100 of the carriage. A friction brake member 122 is associated with each of the members 120 and serves to provide a braking force on the shaft 118 to resist movement of the trough member 98 about the axis of the shaft 118.

There are a number of ejection stations spaced along the trackway 43. There are one or more outgoing pneumatic tubes at each station. In the arrangement shown in FIGURES 1 and 2, there are a total of 13 ejection stations. These stations are arranged in three groups designated in FIGURE 2 as B, C and D, and there are four stations in each group. These groups are known in the trade as lines. Each group extends to a part of the building, for example, group or line B may extend to a certain wing in a hospital, group C may extend to the central portion of the hospital, and group D may extend to a second wing. The purpose of grouping the stations in groups is to simplify the circuitry employed to cause the dispatcher to eject the carrier into the proper outgoing tube. The tubes in each group are numbered 1–8.

In the arrangement shown, there are two outgoing tubes at each ejection station, for example, tubes B1 and B2 are located at the first ejection station, tubes B3 and B4 are arranged at the second station and so forth. All of the odd numbered tubes are located in a lower row and inclined upwardly at an angle, such as 10°. The even numbered tubes are arranged in an upper row and inclined at a greater angle, say, 25°. The outgoing tubes are supported by suitable framework, as uprights 130, FIGURE 16. In FIGURES 1 and 2, the carrier ejector mechanism is shown positioned at the sixth ejection station, for discharge of the carrier into tube 3 of group C.

As stated, there are four stations in each of the three groups B, C, and D. In the thirteenth station, there is a single outgoing tube designated 13. The purpose of the tube 13 is for the reception of a carrier having a defective destination code, or to receive a carrier which cannot be ejected into the proper outgoing tube. This may be because such tube is already occupied by a carrier. In any event, the carriage is moved from the loading station directly to the thirteenth station, and the carrier is ejected into tube 13 and that carrier is recirculated back to the in-feed conveyor belt 57. This function will be more particularly described in connection with the circuitry shown in FIGURES 17–20.

It will be apparent that if the destination code on the carrier requires that the carrier be ejected into the outfeed tube C3, the carriage will have to be propelled along the trackway from the loading station to ejection station 6 and that the trough member 98 will have to be elevated at a 10° angle to bring it in registration with the tube C3, in order that the carrier may be ejected from the trough member 98 into the receiving end of tube C3. If, on the other hand, the destination code requires that the carrier be ejected into tube C4 which is positioned immediately above tube C3, it will be necessary to elevate the trough member 98 to an angle of 25° in order to bring it in proper registration with tube C4.

When the carriage is moved to the right end of the machine, as shown in FIGURES 3 and 10, a roller 140, on the rear end of the trough member 98, engages an inclined cam bar 141 fixedly mounted on a bracket 142, FIGURES 2 and 4, fixed to the cross member 63. As the roller 140 rides upwardly on the cam bar 141, the trough member 98 is moved to horizontal position, as shown in FIGURE 4.

As the carriage motor 107 is energized to advance the carriage from the loading station toward the desired ejection station, the roller 140 is moved out of engagement with the cam bar 141, and the trough member is urged upwardly about the shaft 118 by tension spring 143 connected between the rear end of the trough member and the top plate 100 of the carriage. This upward movement of the trough member is limited by a pin 150 mounted in the lower end of links 151, the upper ends of which are pivotally connected to a bracket 152 affixed to the bottom wall 115 of the trough member.

The links 151 move vertically between plates 153, 154, welded to a base plate 155 which, in turn, is fixed to one of the side members 101 of the carriage. The plates 153, 154 are formed with vertically extending slots 157 in which the ends of the pin 150 slide.

The upward movement of the trough member is limited by the pin 150 engaging a latch 160 which is slidably guided by rollers 161 journalled on studs 162 fixed to the side plate 153. The latch is urged inwardly by a compression spring 163 interposed between the outer end of the latch and the bracket 164 fixed to the side plate 153. The latch and pin arrangement is such that the trough member 98 is moved upwardly of a 10° angle to bring it in registration with the lower row of outfeed tubes 1 to 13 at the ejection stations.

A rotary solenoid 167 is fixed to a plate 168 which, in turn, is fixed to the base plate 155. An arm 169 is fixed to the output shaft 170 of the solenoid 167 and the free end of the arm is positioned in a notch formed in the latch 160.

If the destination code on the carrier requires the carrier to be ejected in a tube in the upper row, the solenoid 167 is energized, moving the latch 160 to the right out of engagement with the pin 150. The pin is then permitted to move to the top of the slot 157, positioning the trough member 98 at an angle of 25° for registration with the outfeed tube in the upper row.

The latch 160 has an inclined end surface 173 to permit the pin 150 to cam the latch 160 outwardly, when the trough member 98 is moved to horizontal position by the cam bar 141 when the carriage 101 is returned to the loading station.

The side walls 116 of the trough member 98 are formed with elongated slots 175, see FIGURES 14, 15, and 16. A plate 177 is mounted for reciprocation between the side walls 116 and is provided with rollers 178 movable in the slots 175.

A stem 179 is fixed to the plate 177 and extends forwardly therefrom, and is provided at its forward end with a disk 180. The stem 179 is bored to slidably receive a stem 181 that carries at its outer end a presser pad 182 for engaging the carrier C. The pad 182 is yieldingly maintained in forwardly spaced relation to the disk 180 by a compression spring 183 acting against the inner end of the stem 181. Relative movement between the presser pad 182 and the disk 180 is limited by a pin 184 carried by the stem 181 and slidable in a slot 185 formed in the stem 179.

The plate 177 is formed with laterally extending ears 187 which extend outwardly through the slots 175. A sprocket 190 is journalled on the outer surface of each of the side walls 116 adjacent the forward end thereof.

A motor 191 is mounted on the bottom wall 115 which extends rearwardly from the side walls 116, see FIGURE 10. This motor has an output shaft 193 extending transversely of the trough member and there is a sprocket 194 attached to each end of the shaft 193.

A chain 197 extends along each side of the trough member and these chains being trained about these sprockets 190, 194. The chains 197 are fixedly secured to the ears 187 of the plate 177.

With this arrangement, when the motor 191 is energized for rotation in one direction, the plate 177 and the presser pad 182 are moved forwardly to eject a carrier C from the trough member to the selected outgoing tube. One of the chains is provided with a switch actuating a dog 200, see FIGURE 14. When the ejection assembly has reached its forward position, as shown in FIGURE 16, the dog 200 actuates a switch 201 which effects reversal of the motor 191, to return the ejector assembly to the rear of the trough member. As the assembly moves rearwardly the dog 200 actuates a switch 203 which brings about reversal of the carriage motor 107 in the manner hereinafter described. When the ejection assembly has reached its fully returned position, the dog 200 actuates a switch 205 to de-energize the motor 191.

Figure 17:
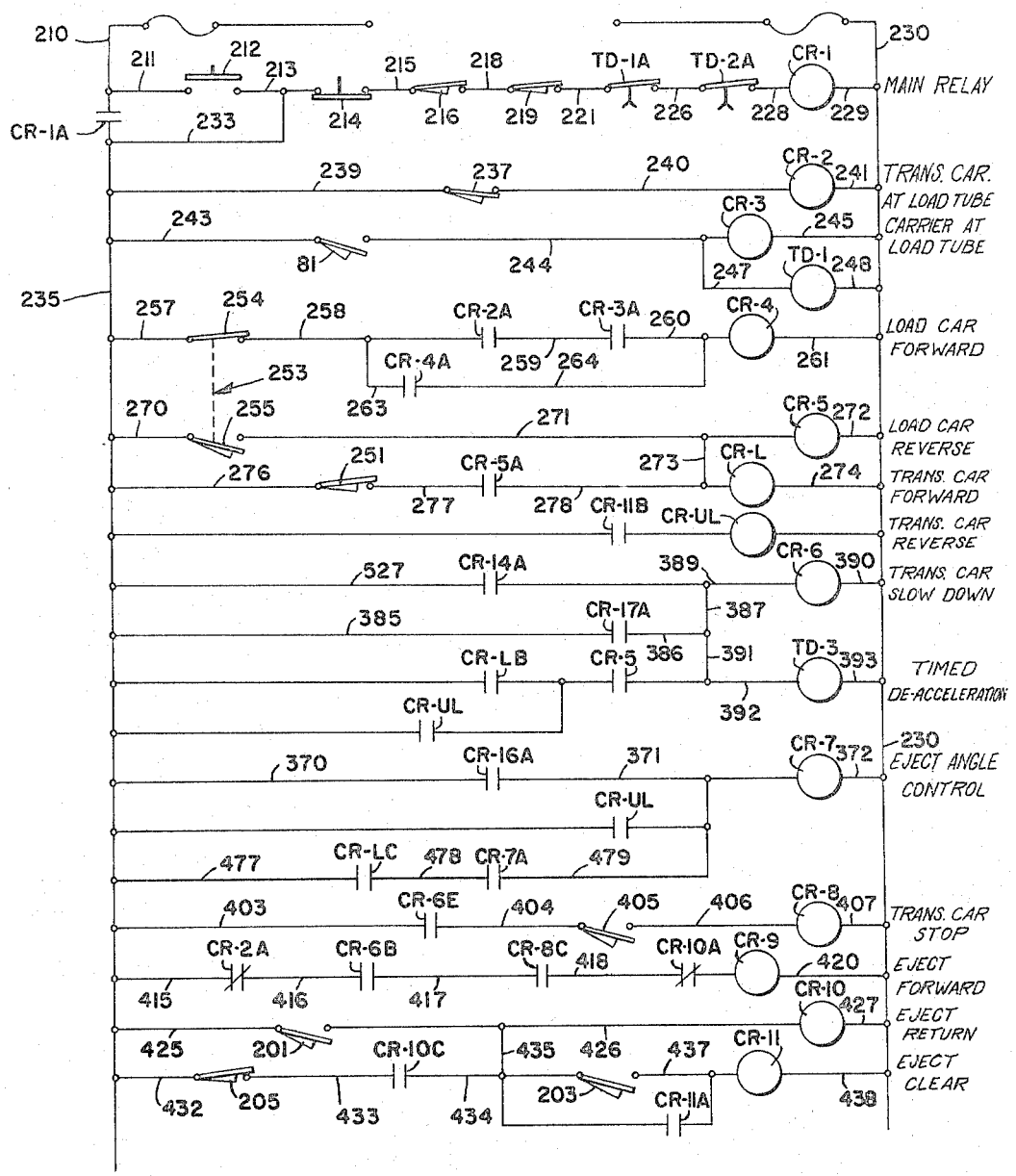

With the loader 73 positioned above the conveyor belt 57, and the transfer carriage 100 positioned at the loading station, as shown in FIGURES 3 and 9, a circuit is established to energize the relay CR–1, FIGURE 17. This circuit is established from the side 210 of the supply, wire 211, the momentarily closed contacts of starting switch 212, wire 213, closed contacts of stopping switch 214, wire 215, closed contacts 216 of switch 217, see FIGURE 1, wire 218, closed contacts 219 of switch 220, see FIGURE 9, wire 221, closed contacts TD–1A of relay TD–1, wire 226, closed contacts TD–2A of relay TD–2, wire 228, relay CR–1, wire 229, to the side 230 of the supply.

Contacts 216 of switch 217 are closed at this time because switch 217 is an over-run safety stop switch which is actuated by the carriage in the event it overruns in a forward direction. Contacts 219 of switch 220 are closed because switch 220, see FIGURE 9, is an over-run safety switch which is actuated only if the carriage over-runs in a reverse direction past the loading station.

Contacts CR–1A, in conjunction with wire 233, provide a shunt circuit about the starting switch 212 to hold relay CR–1 in. These contacts CR–1A also connect side 210 to wire 235 which forms the hot side of the supply for the rest of the circuitry.

With the transfer carriage positioned at the loading station, contacts 237 of switch 238, see FIGURE 9, are closed, establishing a circuit from the side 235, wire 239, contacts 237, wire 240, relay CR–2, wire 241, to the side 230.

When the carrier engages the plate 83, FIGURE 6, to close the contacts of switch 81, a circuit is completed from the side 235 through wire 243, closed contacts of switch 81, wire 244, relay CR–3, wire 245 to the side 230. Relay TD–1 is also energized by the branch circuit including wires 247, 248.

With the load carrier 73 so positioned over the infeed conveyor belt 57, limit switch 250 is engaged by the loader as shown in full lines, FIGURE 7. This engagement opens contacts 251 of the switch 250. With the loader in this position, the switch 253 is not engaged with the result that one set 254 of its contacts are closed and another set 255 of its contacts are open. With the contacts 254 closed, a circuit is established from the side 235 through wire 257, contacts 254, wire 258, contacts CR–2A of relay CR–2, wire 259, contacts CR–3A of relay CR–3, wire 260, relay CR–4, wire 261 to the side 230. Relay CR–4 is provided with hold contacts CR–4A which in conjunction with wires 263–264 provide a shunt circuit about the contacts CR–2A and CR–3A.

Figure 18:
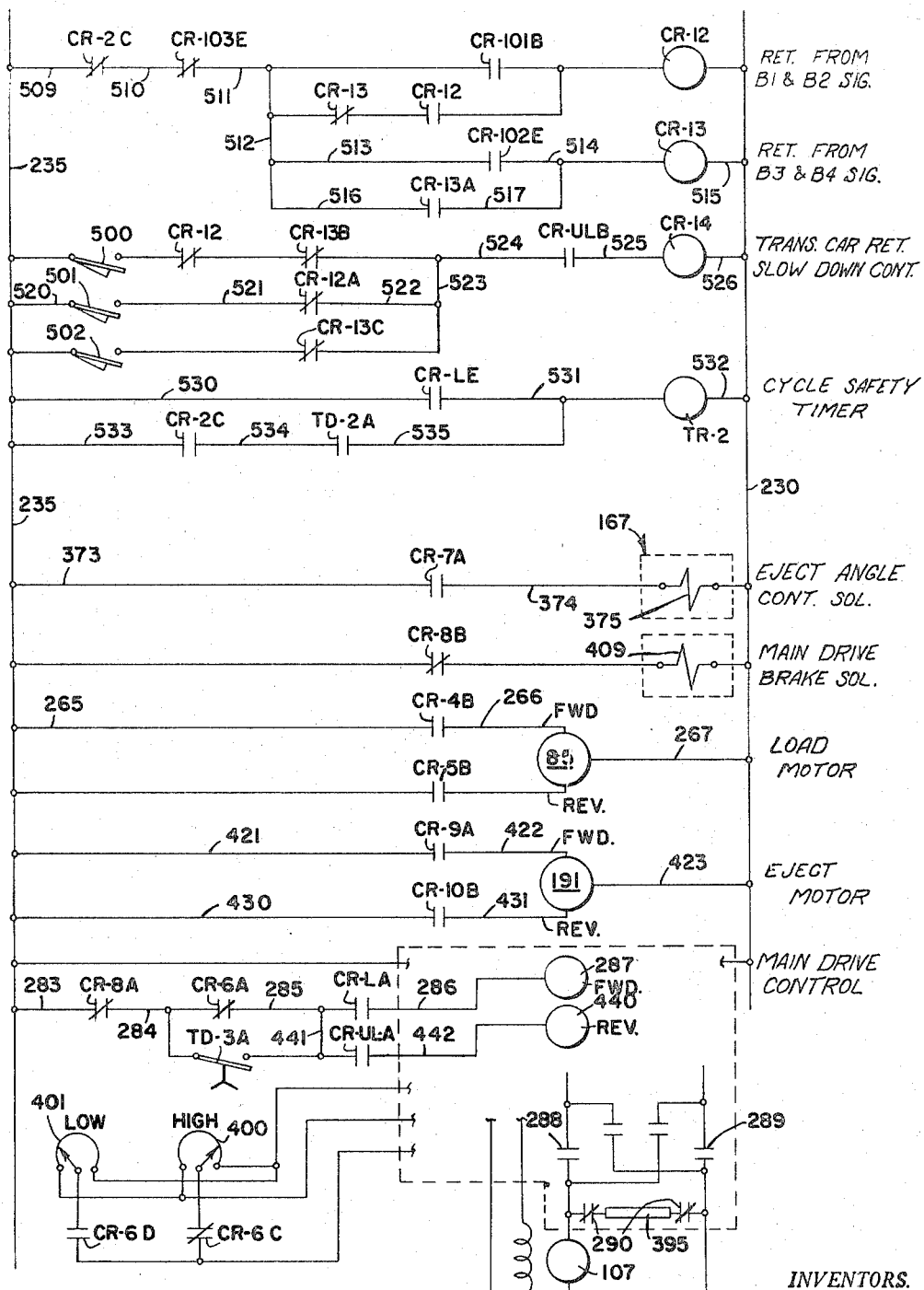

Contacts CR–4B are now closed providing a forward running circuit to the loader motor 85, see FIGURE 18, this circuit extending from the side 235, wire 265, contact CR–4B, wire 266, motor 85, wire 267 to the side 230. The motor 85 now moves the loader to the left in register with the ejection mechanism on the carriage positioned at the loading station, whereby the carrier drops into the trough member 98 of the ejector mechanism.

When the load car moves forwardly in registration with the ejection mechanism on the carriage, it engages and actuates the switch 253 moving the contacts 254, FIGURE 17, out of engagement, and moving the contacts 255 into engagement. This results in dropping out relay CR–4 and energizing relay CR–5 through the following circuit: side 235, wire 270, contacts 255, wire 271, relay CR–5, wire 272, to the side 230. Relay CR–L is also energized by wires 273, 274. A hold circuit is provided for relays CR–5, CR–L, through wire 276, now closed contacts 251 of switch 250, wire 277, contacts CR–5A of relay CR–5, wire 278, wire 273, wire 271, relay CR–5, wire 272, to the side 230, and from wire 278, relay CR–L, wire 274, to side 230.

Power is made available to the motor 107 to drive the carriage in a forward direction. This circuit, see lower portion FIGURE 18, is established from the side 235, through wire 283, normally closed contacts CR–8A of relay CR–8, wire 284, normally closed contacts CR–6A of relay CR–6, wire 285, closed contacts CR–LA of relay CR–L, wire 286, to the forward control coil 287 of the control for motor 107. With coil 287 energized, contacts 288, 289, are closed and contacts 290 are open to provide a running circuit to the motor 107.

It will be noted that contacts 255 of switch 253 only remain closed while the loading car is positioned over the ejection mechanism on the carriage, but relays CR–5 and CR–L were held in through contacts 251 of switch 250, which do not open until the load car returns to carrier receiving position over the conveyor belt 57. The relay CR–L operates in conjunction with a relay CR–UL, and the arrangement is such that the contacts under the control of CR–L remain actuated until relay CR–UL is energized. Accordingly, with this arrangement, the transfer car is now moving in a forward direction and the loading car 73 has been returned to position over the in-feed conveyor belt 57.

The extent of the forward movement of the transfer car is determined by the destination code set up on the carrier now in the ejection mechanism. This code is established by rotating the contact ring 182 on the carrier to bring the mark 290 in registration with a letter, as the letter B, imprinted on the carrier.

Contact ring 181 is provided with a mark 291, FIGURE 6, and is shown in registration with numeral 4 printed on the carrier.

There are a series of brushes mounted in the loader 73 in a row on a bracket 293, the brushes being insulated from each other and from the machine. The brushes are designated L, S, 1, 2, 3, 4, 5, 6, 7, 8. When the carrier has been advanced into the loader 73, the brush L engages the contact ring 182, and the brush S engages the contact ring 181. The brushes numbered 1–8 engage the contact rings 180. The brushes 1 to 8 correspond to outgoing tubes 1 to 8 in each of the groups B, C and D. These brushes also correspond to the numbers on the carrier adjacent the ring 181.

Figure 19:
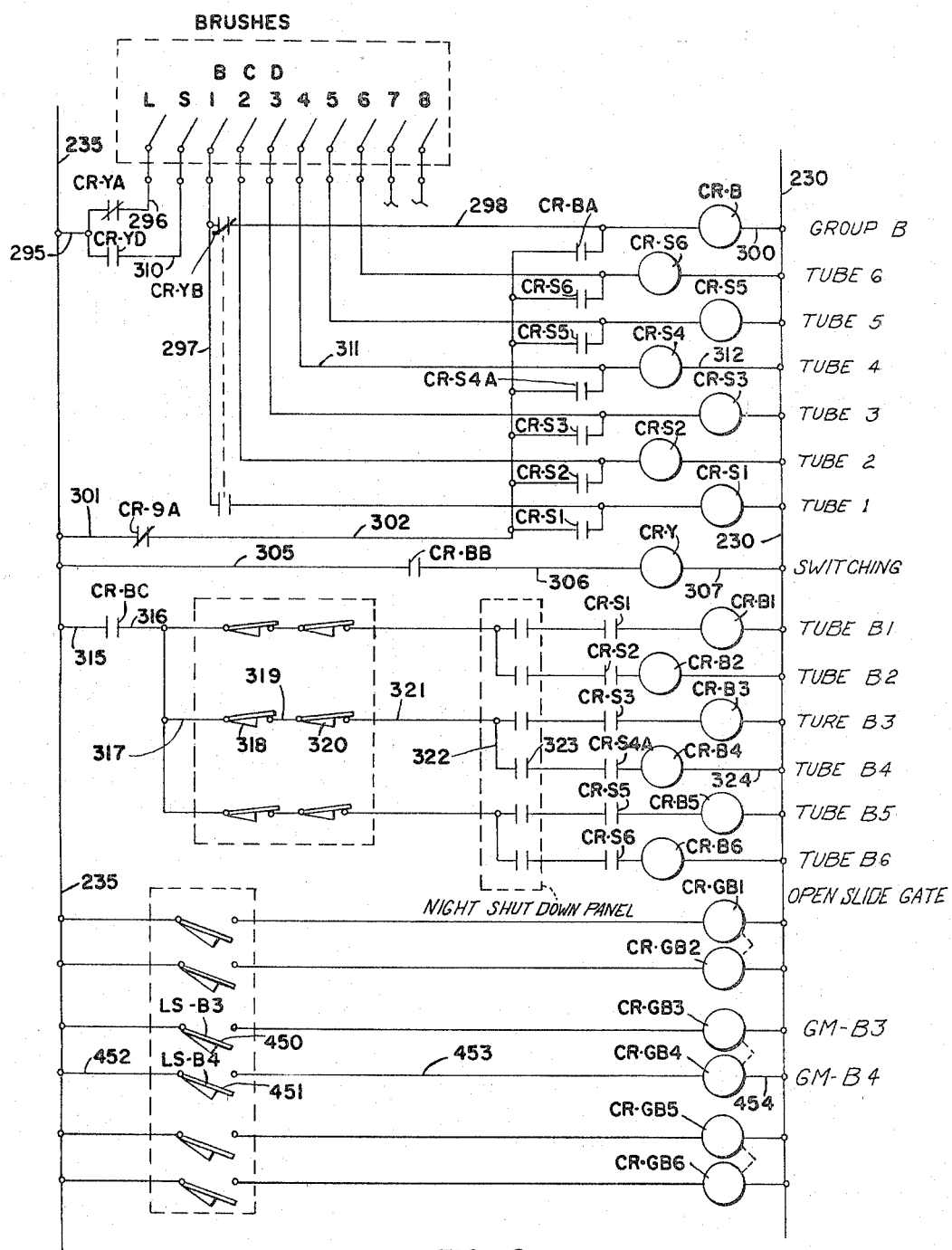

In order to avoid making the description of the operation of the dispatcher of undue length, the circuitry shown, particularly in FIGURE 19, has been limited to illustrate the dispatching of a carrier to only tubes 1 to 6, of group B. In particular, the circuitry will now be described in dispatching the carrier to tube 4 in group B. The code for dispatching the carrier into tube 4 of group B is designated by the positioning of the rings 181, 182, as described above in connection with FIGURE 6. Within the carrier, there are conductors extending from each of the contact rings 180 for engagement by a portion of the rings 181, 182, whereby a selected one of the rings 180 can be electrically connected to the rings 181, 182. With the ring 182 positioned with the mark 290 in registration with the letter B, there is a circuit extending from the ring 182 to the ring 180 under brush No. 1, which is the B group brush. There is, therefore, referring to FIGURE 19, a circuit from side 235, wire 295, closed contacts CR–YA, wire 296, Brush L to Brush 1, wire 297, closed contacts CR–YB, wire 298, relay CR–B, wire 300, to the side 230. This relay is provided with a hold circuit from 235, wire 301, normally closed contacts CR–9A, wire 302, closed contacts CR–BA, to wire 298. There is also now established a circuit from side 235, through wire 305, closed contacts CR–BB, wire 306, relay CR–Y, wire 307, to the side 230. Accordingly, relays CR–B and CR–Y are now energized. This circuit has established that the carrier is destined for an outgoing tube in group B.

With relay CR–Y now energized, contacts CR–YA open, and contacts CR–YD closed, a circuit is established from the side 235, wire 295, contacts CR–YD, wire 310 to brush S, contact ring 181, to contact ring 180, to brush 4, to wire 311, relay CR–S4, wire 312 to the side 230. In like manner, relay CR–S4 is held in through the circuit 235, 301, contacts CR–9A, wire 302, contacts CR–S4A, to wire 311, to relay CR–S4. This circuit establishes that the carrier is to be ejected into tube No. 4.

There is now established a circuit from side 235, wire 315, closed contacts CR–BC, wire 316, wire 317, switch 318, wire 319, switch 320, wire 321, wire 322, contacts 323, contacts CR–S4A, relay CR–B4, wire 324 to the side 230. As will be more fully explained in connection with the diagram FIGURE 20, relay CR–B4 has to be energized in order to provide a stop circuit to the carriage motor 107, when the carrier has been moved into registration with the outgoing tube B4. If relay CR–B4 is not energized, there will be no control stop signal transmitted to the motor 107, and the carriage will continue on until the carrier is positioned in registration with the outgoing tube 13. The switches 318 and 320 in the circuit of relay CR–B4 are mounted in the intake ends of the tubes B3 and B4. The position of these switches are indicated in the FIGURE 16. Each of these switches has an actuator 325 engaged by a pivotally mounted member 326 which extends into the tube. When a carrier is ejected into the tube, the contacts of that switch are open and the actuator 326 for this switch prevents retrograde movement of the carrier out of the tube. It will be apparent that if a carrier is in tube B3, or B4, the contacts of the switch 320, or 325, will be open, and no circuit will be established to pull in relays CR–B3, or CR–B4.

As previously stated, the circuit being described is based on a code destination for ejection of the carrier into the tube B4. The reason why the switches 318 and 320 are connected in series is that normally the tubes B3, B4, would be supplied from a common source of vacuum which might fail and interrupt the operation of both of the tubes B3, B4.

As the transfer carriage moves from the loading station, to the desired ejection station, a switch 327 mounted on a bracket 328, attached to the transfer carriage is actuated by trips 329 mounted on a rail 330 fixed to the frame of the dispatcher, FIGURES 1 and 8. The trips 329 are positioned on the rail 330 intermediate the ejection stations. Accordingly, as the trough member 98 of the ejection mechanism approaches each ejection station, the contacts of switch 327 are closed. The switch 327 serves to count the number of stations, approached and passed by the carriage 100, as it travels along the guide way from the loading station.

In the example under consideration, a carrier, as stated, is to be ejected into tube 4 of group or line B, and that tube is at the second ejection station. Accordingly, as the carriage moves forwardly, the switch 327 was actuated by the first of the trips 329 causing the relay CR–15, FIGURE 20, to be pulled in, this circuit extending from the side 235, through wire 333, normally closed contacts CR–8A of relay CR–8, wire 334, contacts of switch 327, wire 335, relay CR–15, wire 336 to the side 230. This impulse through the contacts of switch 327 also energizes the relay CR–101. The circuit is from wire 334, wire 337, closed contacts CR–15A of relay CR–15, wire 338, relay CR–101, wire 339 to the side 230. Due to the fact that contacts of switch 327 are only closed momentarily, relay CR–15 quickly drops out. However, a hold circuit is provided for relay CR–101 from wire 337, wire 340, closed contacts CR–101A, wires 341, 342, to wire 338, relay CR–101, wire 339 to the side 230.

As the switch 327 passes out of engagement with the first trip 329, contacts of the switch 327 open, dropping out relay CR–15 and a circuit is now provided for energizing relay CR–101A. This circuit extending from wire 337, wire 343, closed contacts CR–15B, wire 345, now closed contacts CR–101B of relay CR–101, wire 347, relay CR–101A, wire 348 to the side 230. The relay CR–101A is held in by its now closed contacts CR–101AB.

Upon the second actuation of switch 327, relay CR–15 is again pulled in and a circuit is established from wire 337, wire 350, contacts CR–15B, wire 351, contacts CR–101AC, wire 352, relay CR–102, wire 353, to the side 230. A circuit is now established from wire 337, through wire 355, closed contacts CR–102A of relay CR–102, wire 356, to wire 352. When switch 327 passes out of engagement with the second trip 329, a circuit is completed from wire 337, wire 357, now closed contacts CR–15E, wire 358, closed contacts CR–102B, wire 360, relay CR–102A, wire 361, to the side 230.

Energization of the relay CR–102A provides a circuit from wire 352, through wire 362, closed contacts CR–102AB, wire 363, through now closed contacts CR–B4A of relay CR–B4 previously energized, FIGURE 19, wire 364, to relay CR–16, wire 365, to the side 230.

Referring now to FIGURE 17 again, there is now a circuit from side 235, wire 370, closed contacts CR–16A, wire 371, to relay CR–7, wire 372, to the side 230.

Referring now to FIGURE 18, there is a circuit from the side 235, through wire 373, contacts CR–7A, wire 374, to coil 375 of the solenoid 167, causing the latch 160 to be moved outwardly to permit the ejector trough 98 to move to the 25° position, so that the carrier, when ejected, will be ejected into the upper B4 outgoing tube.

Referring back again to FIGURE 20, energization of the relay CR–16 establishes a circuit from the wire 337, through wire 380, contacts CR–16B, wires 381, 382, 383, relay CR–17, wire 384, to the side 230. Relay CR–17 is the main stop control relay for the motor 107. At this point, the ejector mechanism is approaching the second station.

Referring to FIGURE 17, a circuit is now established from the side 235, to wire 385, closed contacts CR–17A, wires 386, 387, 389, relay CR–6, wire 390, to the side 230. This circuit also extends from wire 386, through wires 391, 392, to relay TD–3, wire 393, to the side 230. A forward power circuit to the motor 107 is now interrupted by the opening of contacts CR–6A, FIGURE 18, de-energizing the control coil 287, opening the contacts 288, 289, closing contact 290, to connect a resistor 395 across the armature of the motor 107 to effect a braking action to slow down the movement of the carriage 100.

The relay TD–3 is a time controlled relay and when it times out, over a short period, contacts TD–3A close to re-establish power to the control coil 287, the contacts TD–3A being connected in shunt around the contacts CR–6A, whereby contacts 288, 289, are again closed and contacts 290 are opened to re-establish forward power to the now slowed-down carriage.

Power is supplied to the field of the D.C. motor 107, through potentiometers 400, 401. When relay CR–6 is energized, its normally closed contacts CR–6C were opened, and its contacts CR–6D were closed, switching the field supply from the high speed potentiometer 400 to the low speed potentiometer 401, which is now effective by the re-established supply through the closed contacts TD–3A. The transfer carrier is now slowly approaching the second station. With relay CR–6 energized, a circuit is established, FIGURE 17, from the side 235, wire 403, contacts CR–6E, wire 404, switch 405 mounted on the transfer carriage and actuated as the ejector mechanism is in registration at each ejection station, wire 406, relay CR–8, wire 407, to the side 230. The normally closed contacts CR–8A, FIGURE 18, now open to interrupt the circuit to the motor 107. The switch 405 is actuated when the ejector mechanism is in alignment with the outgoing tubes at each station. This actuation is effected by actuating buttons 408 positioned along the top plate 46 of the trackway. These buttons being located to actuate the switch 405 when the ejector 98 is in registration with the tubes at each station. Normally closed contacts CR–8B also open to interrupt the solenoid 409. The solenoid 409 functions, when energized, to maintain a spring actuated brake, mounted in the housing 410 on the top of the motor 107, disenegaged. The application of the brake, when solenoid 409 is disengaged, effects an instant stop of the forward movement of the carriage and with the carrier ejection mechanism now in register with the outgoing tube B4.

With the energization of relay CR–8, a circuit is completed to relay CR–9. This circuit, FIGURE 17, extends from side 235, through wire 415, contacts CR–2A of relay CR–2, wire 416, contacts CR–6B, wire 417, contacts CR–8C of relay CR–8, wire 418, normally closed contacts CR–10A of relay CR–10, relay CR–9, wire 420, to the side 230. Energization of relay CR–9 established power to the ejector motor 191 to move the ejector forward to push the carrier into tube B4. This circuit, FIGURE 18, is from side 230, through wire 421, contacts CR–9A, wire 422, motor 191, wire 423, to the side 230. The ejector moves forwardly and when the carrier has been inserted into the tube, the member 200, FIGURE 14, actuates switch 201 to energize relay CR–10. The circuit, FIGURE 17, is from the side 235, wire 425, switch 201, wire 426, relay CR–10 opens the contacts CR–101A to de-energize relay CR–9. A circuit now extends from the side 235, FIGURE 18, through wire 430, contacts CR–10B, wire 431, to the motor 191 to effect reversal thereof.

Relay CR–10 is held in through a circuit extending from side 235, wire 432, closed contacts of switch 205, FIGURE 16, wire 433, closed contacts CR–10C, wires 434, 435, to wire 426. When the ejector 177 moves rearwardly a sufficient distance so that pad 182 clears the end of the tube, switch 203 is closed, establishing a circuit, FIGURE 17, from wire 434 to wire 437, relay CR–11, wire 438, to the side 230, relay CR–11 being held in by its contacts CR–11A. Its contacts CR–11B, energizes relay CR–UL, FIGURE 17. This opens contacts CR–LA of relay CR–L to open the forward drive circuit to the forward control coil 287, FIGURE 18, of the carriage motor 107, and the closing of contacts CR–UL–A establishes a circuit to the reverse coil 440, this circuit extending from wire 285, through wire 441, contacts CR–UL–A, wire 442, to the coil 440. The transfer carriage is now moving toward the loading station.

The ejector 177 continues its rearward movement until switch 205 is actuated. Referring to FIGURE 17, it will be apparent that opening switch 205 opens the hold circuit for both relays CR–10 and CR–11.

Referring back to FIGURE 19, it was pointed out that the switches 318, 320, had to be closed in order to energize the tube selection CR–B4. The switches 318, 320, are double-pole switches. However, to simplify the diagram, the second poles of these switches are illustrated as 450, 451, in the lower left portion of FIGURE 19. When the carrier was injected into outgoing tube B–4, the switch 320 was opened and the contact 451 thereof closed to establish a circuit from the side 235, through wire 452, contacts 451, wire 453, relay CR–GB4, wire 454, to the side 230. The relay CR–6B4 and the relay above it, CR–GB3 are paired latch relays, as CR–L and CR–UL, in FIGURE 17. That is, when one relay pulls in it holds until the other is energized.

Figure 20:
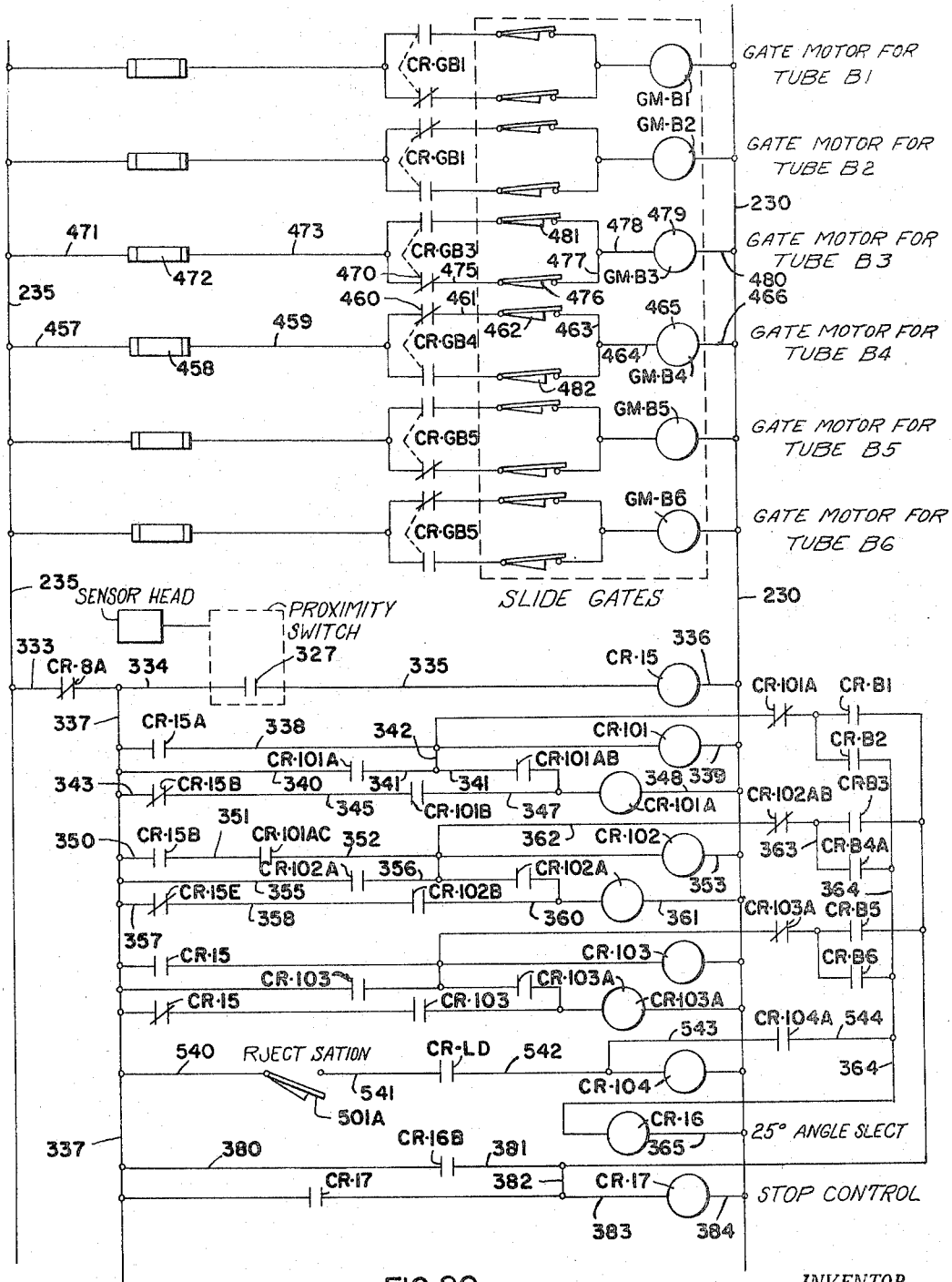

Referring now to FIGURE 20, there is a circuit from the side 235, through wire 457, fuse 458, wire 459, through normally closed contacts 460, of relay CR–GB3, which has been unlatched by the energization of relay CR–GB4, wire 461, switch 462, wires 463, 464, gate motor 465, wire 466, to the side 230.

Referring to FIGURE 16, the outgoing tubes are each provided with a gate in a housing 467. The gate in the tube B–4 is operated by a motor 465 to move the gate open and closed positions in order to connect and disconnect the tube with the source of vacuum to move the carrier that has been inserted into the tube. The motors 465 rotate in one direction to open and close the gate. When the motor 465 has opened the gate, the switch 462 is opened. As has been previously stated, pairs of outgoing tubes as B–3, B–4, are connected to a single source of vacuum. Accordingly, with a carrier inserted in tube B–4, it is necessary to close the gate in tube B–3, so that when the gate is opened in tube B–4, vacuum will be supplied thereto to effect movement of the carrier.

Referring again to FIGURE 20, with relay CR–GB3 released by the energization of relay CR–GB4, contacts 470 are closed, establishing a circuit from side 235, wire 471, fuse 472, wire 473, contacts 470, wire 475, contacts 476, wires 477, 478, gate motor 479, wire 480, to the side 230. Energized gate motor 479 now closes the gate in tube B–3, so that vacuum is applied to tube B–4. As previously stated, each of the motors 465, 479, are each provided with a cam which, upon rotation in one direction, successively opens the switches 462, 482 and 476, 481. In other words, when a gate is opened, or closed, one of these switches is open, and the other is closed.

It will be recalled that the carriage is now moving rearwardly toward the loading station. Fixed to the trackway, in proximity to the loading station, are switches 500, 501, 502. These switches are included in the upper left portion of the diagram, FIGURE 18. These switches, when actuated, bring in relay CR–14 which, when energized, pulls in relay CR–6 which, as previously explained in connection with the forward motion of the carriage, brings in the slow-down control.

Referring now to FIGURE 18, relay CR–2 is now de-energized, because contacts 237, FIGURE 17, are open. Relay CR–103 was not (FIGURE 20) energized for ejection in tube B–4. Relay CR–101 was energized but has since dropped out, so no circuit is established to relay CR–12. However, there is a circuit to relay CR–13 from side 235, wire 509, normally closed contacts CR–2C, wire 510, contacts CR–103E, wire 511, wires 512, 513, closed contacts CR–102E of relay CR–102, wire 514, relay CR–13, wire 515, to the side 230. Relay CR–13 is held in by a circuit shunting the contacts CR–102E, including wires 516, contacts CR–13A and wire 517. With relay CR–13 energized, contacts CR–13B and CR–13C are open.

Accordingly, when the carriage actuates switch 500, no circuit is completed to relay CR–14. However, when the carriage actuates switch 501, the circuit to relay CR–14 is completed, to bring about the slow-down of the carriage.

This circuit extends from the side 235, FIGURE 18, wire 520, closed switch 501, wire 521, normally closed contacts CR–12A of de-energized relay CR–12, wires 522, 523, 524, contacts CR–ULB, of the now energized reverse carriage relay CR–UL, wire 526 to the side 230.

With relay CR–14 energized, relay CR–6 is again energized through the contacts CR–14A, FIGURE 17, and this brings about the slow down of the carriage motor 107, as previously explained in connection with the forward movement of the carriage. When the carriage has returned to the loading station, the switch 405 is actuated by one of the buttons 408, to pull in relay CR–8, in the manner previously described, which opens the circuit to the return control coil 440 of the motor 107, FIGURE 18, causing the carriage to stop at the loading station, at which time it also closes the contacts 237 of switch 238.

The purpose of having the three switches, 500, 501, 502, is to effect slow down of the return movement of the carriage on the basis of the extent of the travel of the carriage on the return movement. In other words, if the selected outgoing tube for reception of the carrier is an appreciable distance down the trackway from the loading station, the switch 500 will be actuated and will be then effective to pull in relay CR–14. This due to the fact that at an ejection station an appreciable distance from the loading station, relays CR–12 and CR–13 will not be energized, and accordingly, actuation of the switch 500 will then pull in relay CR–14. If the selected station is a less distance from the loading station, as the selected outgoing tube B–4 in the above description, relay CR–12 will, also, not be energized, but relay CR–13 will be energized, as explained above, so actuation of the second switch 501 will result in bringing in relay CR–14. If the carrier is to be dispatched at the first station for tubes 1 or 2, neither relay CR–12 or relay CR–13 will be energized, permitting switch 502 to pull in relay CR–14 through the normally closed contacts CR–13C. All of this in effect results in applying the slow down to the motor 107 a greater or a less distance from the loading station.

Referring to FIGURE 17, again it will be noted that the relay CR–1 may be referred to as the main control relay because its contacts CR–1A provide the hot feed to the side 235 for all of the control circuitry in FIGURES 17–20. Accordingly, if there is a power interruption after a carrier has been deposited from the loader into the ejector mechanism on the carriage, relay CR–1 will drop out and all control circuitry will, therefore, be neutralized, or in other words, the control circuitry that was sent up in accordance with the code sensed on the carrier, will be erased. On resumption of power, the tube selection circuitry, in the lower part of FIGURE 20, will not be re-established. Nevertheless, relay CR–L will be again energized to provide power for the forward movement of the carriage. However, because there is no tube selection circuitry energized, actuation of the switch 327 by the trips 329 will have no effect on setting up the slow down and stop circuitry for the carriage motor 107 to position the ejection mechanism in registration with any of the tubes in any of the groups B, C, and D.

In this situation, the carriage will continue on down to the end of the trackway, actuating a switch 510A, FIGURE 1, which establishes a circuit, FIGURE 20, from wire 337, wire 540, contacts of switch 501A, wire 541, closed contacts CR–LD, wire 542, relay CR–104 to the side 230. Energized relay CR–104, through wire 543, contacts CR–104A, wire 544, and wire 364, provides power to pull in relay CR–16, which when energized, operates the solenoid coil 375 to permit the ejector to move to the 25° angle, and, also, pulls in relay CR–17, which is the stop control relay, all as previously described, with the result that the ejector mechanism is stopped in registration with the outgoing tube 13. This tube is arranged to re-circulate the carrier to the conveyor belt 57 so that the carrier may be re-circulated through the dispatcher for ejection into the proper tube, according to the code on the carrier.

All of this to the same effect, if a carrier is advanced to the loader, and does not have any code destination, or has a defective code destination, as, for example, if a carrier is placed on the conveyor belt 57, wrong end to. It will be apparent from the description above that if the sensed code is not such as to establish the tube selection circuitry, in the lower portion of FIGURE 20, no station call relay will be energized, or in other words, the coding circuitry under the control of CR–15 will not function to set up the slow down and stop circuitry for the carriage for any of the stations, at which the outgoing groups of tubes, B, C, and D are located.

What we claim is:

1. A central exchange dispatcher for pneumatic tube systems for the transmission of carriers therethrough comprising a code sensing station, carriers for transmission through said system means operable to present said carriers successively to said station, each of said carriers being provided with a destination code, a plurality of carrier ejection stations, an outgoing tube at each of said ejection stations, means at said sensing station operable to sense the destination code on a carrier when present at said sensing station, a trackway extending from said sensing station to said ejection stations, means for conveying said carriers from said sensing station along said trackway to an ejection station preselected by the code of said carrier, and carrier ejector mechanism carried by said conveying means operable to eject said carrier into the outgoing tube at said selected ejection station.

2. A central exchange dispatcher for pneumatic tube systems for the transmission of carriers therethrough comprising an elongated trackway, a plurality of carrier ejection stations spaced along said trackway, an outgoing tube at each of said ejection stations, carriers for transmission through said system, each of said carriers having a destination code, a code sensing station, means operable to present coded carriers successively to said sensing station, code sensing means at said sensing station and operable to sense the destination code of a carrier when present at said sensing station, means operable in response to the sensed code of a carrier at said sensing station to move said carrier along said trackway to an ejection station, preselected by the code of said carrier and carrier ejector mechanism carried by said conveying means operable to eject said carrier into the outgoing tube at said preselected station.

3. A central exchange dispatcher for pneumatic tube systems for the transmission of carriers therethrough comprising an elongated trackway, a plurality of carrier ejection stations spaced along said trackway, a carrier re-circulating ejector station, an outgoing tube at each of said ejection stations, a code sensing station, carriers for transmission through said system, each of said carriers having a destination code, means operable to present coded carriers successively to said sensing station, code sensing means at said sensing station and operable to sense the destination code of a carrier when present at said sensing station, means operable in response to the sensed code of a carrier at said sensing station to move said carrier along said trackway to an ejection station, preselected by the code of said carrier means operable upon the outgoing tube at said preselected ejection station being unavailable to receive said carrier to cause said carrier to be moved to said re-circulating station, and mechanism operable to eject said carrier into the outgoing tube at said re-circulating station.

4. The central exchange dispatcher set forth in claim 3 and including means operable upon said sensing means sensing a defective code to move said carrier along said trackway to said re-circulating station for ejection of the carrier into the tube thereat.

5. A central exchange dispatcher for pneumatic tube systems for the transmission of carriers therethrough comprising, an elongated trackway, a plurality of carrier ejection stations spaced along said trackway, an outgoing carrier tube located at each of said ejection stations, a carriage mounted on said trackway for reciprocation between a loading station, and any selected one of said ejection stations, a procession of carriers, means for advancing said procession of carriers, each of said carriers being provided with a destination code, and depositing said carriers successively in said carriage, code sensing means operable to sense the code of each carrier deposited in said carriage, carriage actuating means operable to move said carriage from said loading station to an ejection station preselected by the code of said carrier in said carriage, carrier ejection mechanism mounted on said carriage and operable to eject the carrier therefrom into the outgoing tube at said preselected ejection station, and means operable upon said ejection to return said carriage to said loading station.

6. A central exchange dispatcher as defined in claim 5, including means operable to reduce the speed of movement of said carriage as the same is advanced in proximity to said preselected ejector station.

7. Apparatus as defined in claim 1, wherein said ejection mechanism includes a trough-shaped member for receiving said carrier, an ejector pad mounted in said trough-shaped member for reciprocation in a direction lengthwise thereof, and a reversible motor operatively connected to said ejector pad for effecting reciprocation thereof.

8. A central exchange dispatcher for pneumatic tube systems for the transmission of carriers therethrough comprising an elongated trackway, a plurality of carrier ejection stations spaced along said trackway, a plurality of outgoing carrier tubes arranged at each of said ejection stations, the outgoing tubes at each ejection station being located at different elevations, and being inclined upwardly from the horizontal, a carriage, a carrier ejection mechanism mounted on said carriage and being movable, selectively in registration with an outgoing tube at a selected ejection station, carriers for transmission through said system carrier advancing means for advancing a procession of said carriers, each of said carriers being provided with a destination code, and depositing said carriers successively into said ejection mechanism, code sensing means operable to sense the code of each of said carriers deposited in said ejection mechanism, carriage actuating means operable to move said carriage from said loading station to an ejection station preselected by the code of said carrier, and means operable in accordance with the code of said carrier to move said ejection mechanism in registration with an outgoing tube at said preselected ejection station, said outgoing tube being preselected by the code of said carrier, said ejection mechanism being operable when moved into registration with said preselected outgoing tube to eject the carrier into said tube and means for effecting return of said carriage to said loading station.

9. A central exchange dispatcher for pneumatic tube systems for the transmission of carriers therethrough comprising an elongated trackway, a loader at one end of said trackway, a plurality of carrier ejection stations spaced along said trackway, an outgoing carrier tube located at each of said ejection stations, a carriage mounted on said trackway for reciprocation thereon between a loading station and any selected one of said ejection stations, a carrier ejection mechanism mounted on said carriage, carriers for transmission through said system, each of said carriers having a destination code, means for advancing said coded carriers successively into said loader, code sensing means operable to sense the code of each carrier deposited in said loader, means operable to move said loader to said loading station for deposit of a coded carrier into the ejection mechanism on said carriage, means operable to move said carriage along said trackway to an ejection station preselected by the code of said carrier, said ejection mechanism being operable upon arrival at said preselected station to eject the carrier into the outgoing tube at said preselected ejection station, and means operable upon said ejection to return said carriage to said loading station.

10. A central exchange dispatcher as defined in claim 9, wherein said code sensing means is mounted in said loader.

11. A central exchange dispatcher for pneumatic tube systems for the transmission of carriers therethrough comprising a code sensing station, carriers for transmission through said system means operable to present said carriers successively to said station, each of said carriers being provided with a destination code, a plurality of carrier ejection stations, a plurality of outgoing carrier tubes arranged at each of said ejection stations, the outgoing tubes at each ejection station being located at different elevations, means at said sensing station and operable to sense the destination code on a carrier presented at said sensing station, a trackway extending from said sensing station along said ejection stations, means for conveying a sensed carrier from said sensing station along said trackway to an ejection station preselected by the code of said carrier, and carrier ejection mechanism operable to eject said carrier axially into an outgoing tube at said preselected ejection station, said outgoing tube being preselected by the code on said carrier.

References Cited by the Examiner

UNITED STATES PATENTS

| | | |
|---|---|---|
| 1,838,208 | 12/1931 | Appelius. |
| 2,797,057 | 6/1957 | Sindzinski et al. ____ 198—38 X |
| 2,900,146 | 8/1959 | Hafner et al. |
| 2,970,791 | 2/1961 | Hafner et al. |
| 3,055,611 | 9/1962 | Stout et al. |

EVON C. BLUNK, *Primary Examiner.*

R. E. KRISHER, *Assistant Examiner.*